6394X
N. Pierce,
Fire Engine,
Patented Feb. 23, 1831.
No Printed Specification Available
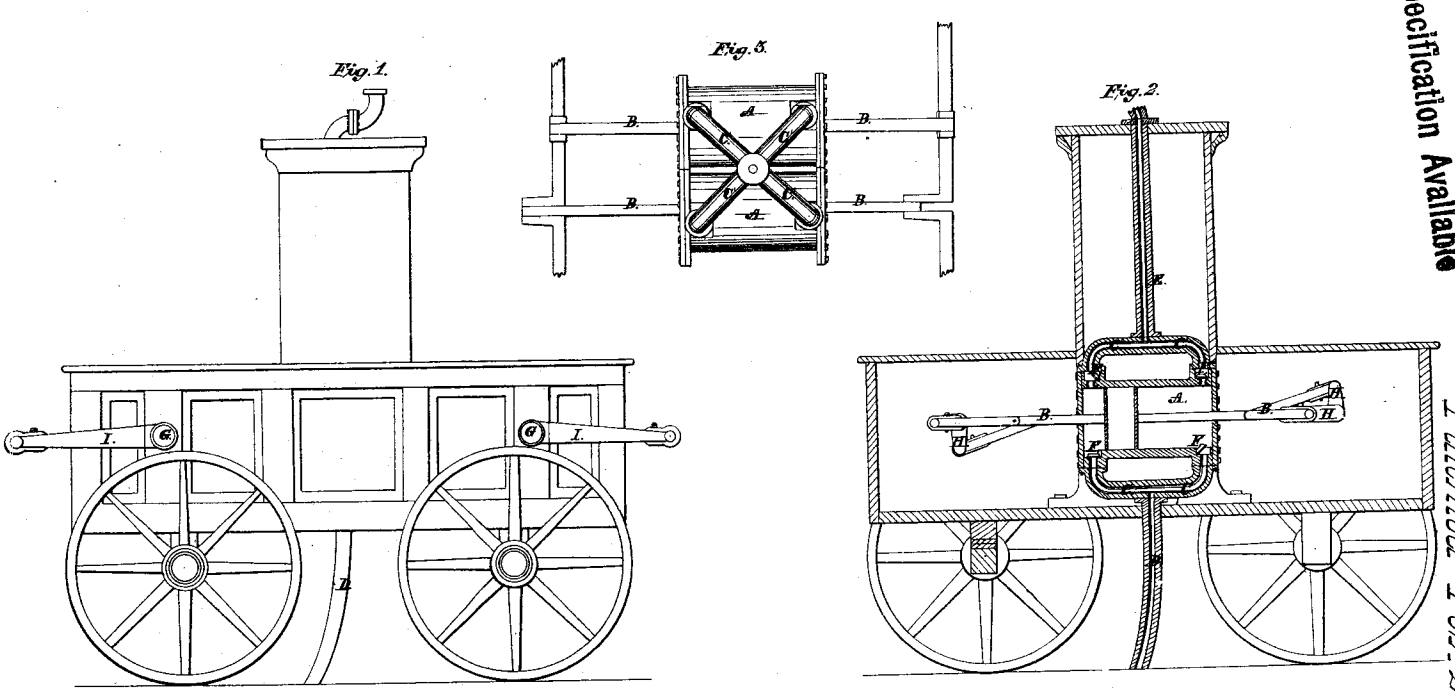
N. PETERS, PHOTO-LITHOGRAPHER, WASHINGTON, D. C.

6394X Nathan Pierce. A Citizen of

Letters Patent.

The Schedule referred to in these Letters Patent, & making part of the same containing a description in the words of the said Nathan Pierce himself of his improvement in the Fire Engine.

The Engine consists of two cylinders, placed parallel with each other at a distance from each other depending upon the size of the engine to be made, — these cylinders may be placed either perpendicular or horizontal, — said cylinders may be longer or shorter of greater or less diameter according to the quantity of water designed to be forced out. The ends of the said cylinders are to be enclosed so as to be water tight, in the said cylinder are pistons, so fitted to the inside as to move backwards & forwards with as little friction as possible & prevent water from passing by them. Attached to these pistons are rods extending out through the center of the heads of the cylinders, so fitted that water cannot pass out by them. At each end of the two cylinders are conducting pipes, through which the water is forced by suction into the cylinders; — these four conducting pipes unite together in one pipe, called the suction pipe which first receives the water from the reservoir or fountain. In each of these four conducting pipes are valves opening towards the cylinders to give passage to the water into the cylinders & prevent its return. Also at each end of the two cylinders are conducting pipes with a valve in each, so opening as to let the water out of the cylinders & prevent its return. The four conducting pipes last mentioned centre together in one discharging spout. On each end of the piston rods a lever is hung on a pivot and from thence projecting out to cranks made on shafts. — There are two shafts, one at each of the ends of the cylinders, & each shaft, by means of its cranks, connect with the two levers, projecting from the ends of the cylinders next to each shaft. The cranks to which the levers connect are two on each shaft. Their distance from each other upon the shafts Drawing shafts depending upon the distance between the two cylinders. & standing at an angle with each other of ninety degrees, so that when one crank is perpendicular, the other lies horizontal & when the shafts are turned round, one follows the other, at a quarter of a circle distance, and thus while the shafts are in motion, the pistons in the two cylinders move backwards & forwards, thus forcing the water through the four conducting pipes first mentioned into the cylinders, and out from the cylinders through the conducting pipes into the discharging spout with a uniform & constant stream. The cranks upon the shafts that move the levers & pistons may be longer or shorter, depending upon the distance, the pistons are to be moved in the cylinders. The cranks that move the same piston rod must be made with reference to each other, so that when in motion, they shall agree in moving the piston in the same direction. The engine should be confined in a proper frame or carriage — The shafts project at right angles each way from the ends of the lev[illegible] so far that hand cranks may be put on at each end of the shafts, at each side of the engine carriage, so that a sufficient number of men may stand at each hand crank to turn the shafts — An engine may be made with only two hand cranks, In that case one shaft is sufficient the piston rods in such case project out only at one end of each of the cylinders, the ends next to the shaft. The engine may be made of tin iron or any metallic substance. Some among other of the advantages of an engine so constructed upon the principles above mentioned, over any that has been previously built, are that the costs of building it will be much less — that a more uniform and constant stream of water may be forced out — that the friction is so much less, and the machinery so simple that it is believed that not more than half the power necessary to work an engine upon the old plan will be requisite for this. And finally that it will be much less liable to get out of repair than any that have been made upon different principles.

Exd. [illegible]

Witnesses
Wm. H. Parker
Julian A. Buel

Nathan Pierce,
([illegible])

(Feb 23 1831)